United States Patent
Ishimoto

(10) Patent No.: US 9,248,767 B2
(45) Date of Patent: Feb. 2, 2016

(54) VEHICLE SEAT

(71) Applicant: Manabu Ishimoto, Chiryu (JP)

(72) Inventor: Manabu Ishimoto, Chiryu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 41 days.

(21) Appl. No.: 14/345,514

(22) PCT Filed: Sep. 17, 2012

(86) PCT No.: PCT/IB2012/001799
§ 371 (c)(1),
(2) Date: Mar. 18, 2014

(87) PCT Pub. No.: WO2013/041933
PCT Pub. Date: Mar. 28, 2013

(65) Prior Publication Data
US 2014/0354025 A1 Dec. 4, 2014

(30) Foreign Application Priority Data

Sep. 20, 2011 (JP) ................. 2011-204781

(51) Int. Cl.
*B60N 2/48* (2006.01)
*B60N 2/68* (2006.01)
*B60N 2/42* (2006.01)

(52) U.S. Cl.
CPC ............ *B60N 2/4841* (2013.01); *B60N 2/4228* (2013.01); *B60N 2/4838* (2013.01); *B60N 2/4885* (2013.01); *B60N 2/68* (2013.01); *B60N 2002/4897* (2013.01)

(58) Field of Classification Search
CPC ...... B60N 2/4885; B60N 2/68; B60N 2/4228; B60N 2/4838; B60N 2/4841
USPC ....................... 297/216.12, 216.14
See application file for complete search history.

(56) References Cited

U.S. PATENT DOCUMENTS

| | | | | |
|---|---|---|---|---|
| 5,378,043 A | * | 1/1995 | Viano et al. | 297/216.12 |
| 6,702,377 B2 | * | 3/2004 | Nakano | 297/216.12 |
| 6,749,256 B1 | * | 6/2004 | Klier et al. | 297/216.12 X |
| 2005/0127736 A1 | | 6/2005 | Ohchi et al. | |
| 2010/0276978 A1 | | 11/2010 | Furuta et al. | |

FOREIGN PATENT DOCUMENTS

| | | |
|---|---|---|
| DE | 199 24 236 C1 | 10/2000 |
| GB | 1 483 567 | 8/1977 |
| JP | 63-146549 | 9/1988 |
| JP | 6-181824 | 7/1994 |
| JP | 2002-36927 | 2/2002 |
| JP | 2002-225610 | 8/2002 |
| JP | 2004-17826 | 1/2004 |
| JP | 2005-153630 | 6/2005 |
| JP | 2008-94219 | 4/2008 |
| JP | 2008-506428 | 11/2008 |
| JP | 2009-143291 | 7/2009 |
| JP | 2009-183695 | 8/2009 |

* cited by examiner

*Primary Examiner* — Anthony D Barfield
(74) *Attorney, Agent, or Firm* — Finnegan, Henderson, Farabow, Garrett & Dunner, LLP

(57) ABSTRACT

In a vehicle seat, a bracket contact member is fixed to a seat back frame and contacts support brackets in an initial use position, to suppress rearward tilting of a head rest with respect to the seat back frame. While suppressing rearward tilting, forward tilting of the head rest with respect to the seat back frame from the initial use position, by inertia force in the event of a rear-end collision of a vehicle, is not suppressed by the contact member.

7 Claims, 6 Drawing Sheets

VEHICLE SEAT

CROSS-REFERENCE TO RELATED APPLICATIONS

This application is a national phase application of international Application No. PCT/IB2012/001799, filed Sep. 17, 2012, and claims the priority of Japanese Application No. 2011-204781, filed Sep. 20, 2011, the content of both of which is incorporated herein by reference.

BACKGROUND OF THE INVENTION

1. Field of the Invention

The invention relates to a vehicle seat that has a head rest.

2. Description of Related Art

A vehicle seat described in Japanese Patent Application Publication No. 2004-017826 (JP 2004-017826 A) includes support brackets, head rest supports and a back receiving member. The support brackets are fixed to a seat back frame. The head rest supports are respectively connected to the support brackets, and a head rest is connected to the upper end portions of the head rest supports. The back receiving member is coupled to the lower end portions of the head rest supports. In the vehicle seat, when the back receiving member is pressed by the back of a seated occupant in the event of a rear-end collision of a vehicle, the head rest supports tilt forward with respect to the support brackets while deforming elastic members provided between the head rest supports and the support brackets. By so doing, the head rest connected to the head rest supports is moved forward, and the head of the seated occupant is received by the head rest so as not to be further moved rearward.

In the thus configured vehicle seat, the head rest moves forward in the event of a rear-end collision of the vehicle. By so doing, it is possible to reduce a period of time (so-called contact time) from occurrence of the rear-end collision to when the head of the passenger contacts the head rest. By so doing, it is possible to improve the whiplash reducing effect of the head rest. However, the large back receiving member and the elastic members are required, so there is still room for improvement in terms of simplification of the configuration.

SUMMARY OF THE INVENTION

The invention provides a vehicle seat that is able to reduce a contact time with a simple configuration.

An aspect of the invention provides a vehicle seat. The vehicle seat includes: a seat back frame; a support bracket that is fixed to an upper portion of the seat back frame, wherein a head rest support is connected to the support bracket, and the support bracket supports a head rest via the head rest support; and a bracket contact member that is connected to the seat back frame, and that contacts the support bracket to suppress rearward tilting of the head rest with respect to the seat back frame.

In the above-configured vehicle seat, the bracket contact member connected to the seat back frame contacts the support bracket to suppress rearward tilting of the head rest with respect to the seat back frame. By so doing, the stiffness at the time when the head rest tilts forward with respect to the seat back frame is lower than the stiffness at the time when the head rest tilts rearward with respect to the seat back frame. Therefore, when impact force in the event of a rear-end collision of the vehicle is input to the vehicle seat, the forward tilting angle of the head rest is larger than the rearward tilting angle at the time when the head rest tilts (oscillates) forward and rearward with respect to the seat back frame by inertia force. By so doing, it is possible to tilt the head rest forward by a larger angle, so it is possible to bring the head rest close to the head of the seated occupant. As a result, it is possible to reduce a period of time (contact time) from occurrence of a rear-end collision of the vehicle to when the head of the seated occupant contacts the head rest. In addition, a bracket contact member is just connected to the seat back frame, so the configuration is simple.

In the vehicle seat according to the aspect of the invention, an upper frame that extends in a seat back width direction may be provided at the upper portion of the seat back frame, and the support bracket may be fixed to the upper frame in a state where a lower end of the support bracket protrudes toward a seat back lower side beyond the upper frame. In addition, the bracket contact member may be arranged below the upper frame, and may be in contact with a front face at a lower portion of the support bracket.

In the above-configured vehicle seat, the support bracket is fixed to the upper frame provided at the upper portion of the seat back frame. Therefore, when the head rest tilts rearward with respect to the seat back frame, the support bracket rotates around the upper frame. At this time, the lower end of the support bracket protruding downward from the upper frame attempts to be displaced toward a seat back front side; however, the bracket contact member fixed to the seat back frame contacts the front face at the lower portion of the support bracket. By so doing, it is possible to suppress the above displacement of the head rest support, so it is possible to suppress rearward tilting of the head rest with respect to the seat back frame. In addition, in the seat back, the bracket contact member is arranged below the upper frame (upper portion) of the seat back frame, so it is desirable because the space on a seat back upper side of the upper frame is not unnecessarily occupied by the arrangement space of the bracket contact member.

In the vehicle seat according to the aspect of the invention, the seat back frame may have a pair of left and right side frames that extend in a seat back height direction, upper portions of the pair of side frames being coupled by the upper frame, and the bracket contact member may be bridged between the pair of side frames.

In the above-configured vehicle seat, the bracket contact member is bridged between the pair of left and right side frames provided in the seat back frame. Therefore, it is possible to firmly support a load, input to the bracket contact member via the support bracket by the pair of left and right side frames.

In the vehicle seat according to the aspect of the invention, the bracket contact member may be a solid rod material.

In the above-configured vehicle seat, the bracket contact member is formed of a solid rod material, so it is possible to extremely simplify the configuration of the bracket contact member.

The vehicle seat according to the aspect of the invention may further include a lock mechanism that, when the support bracket is displaced with respect to the seat back frame as the head rest tilts forward with respect to the seat back frame, restrains the head rest support at the displaced position.

In the above-configured vehicle seat, when the head rest tilts forward with respect to the seat back frame in the event of a rear-end collision of the vehicle and, as a result, the support bracket is displaced with respect to the seat back frame, the support bracket is restrained by the lock mechanism at the displaced position. By so doing, it is possible to restrain the head rest at the forward tilted position, so it is possible to suppress rearward tilting of the head of the seated occupant after the head of the seated occupant is received by the head rest.

As described above, with the vehicle seat according to the aspect of the invention, it is possible to reduce a contact time with a simple configuration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
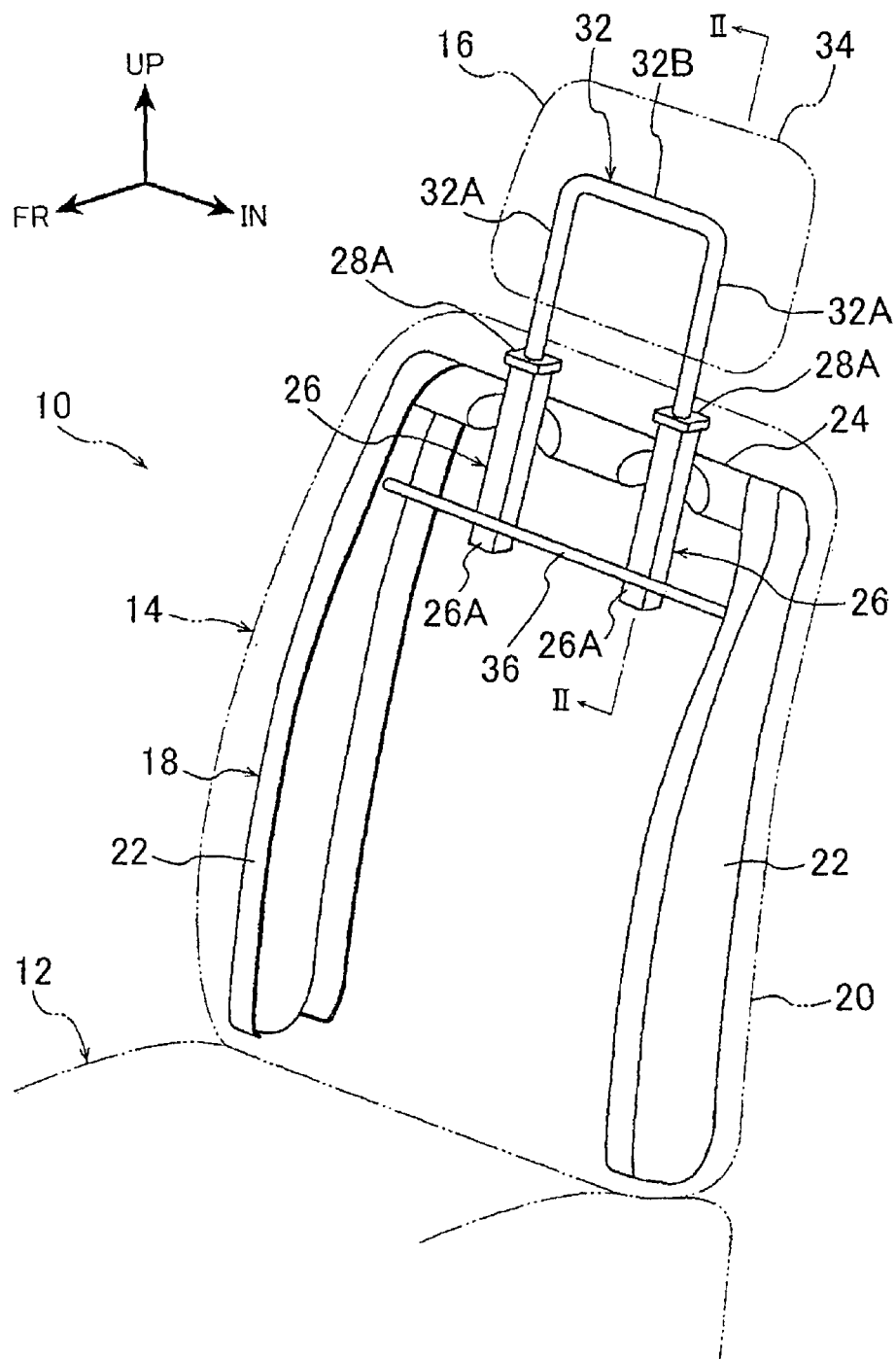
FIG. 1 is a perspective view that shows the configuration of a major portion of a vehicle seat according to an embodiment of the invention.

Hereinafter, a vehicle seat 10 according to an embodiment of the invention will be described with reference to FIG. 1 to FIG. 5. Note that, in the drawings, the arrow FR indicates a vehicle front side, the arrow UP indicates a vehicle upper side, and the arrow IN indicates an inner side in a vehicle transverse direction.

As shown in FIG. 1, the vehicle seat 10 according to the present embodiment is formed of a seat cushion 12, a seat back 14 and a head rest 16. The seat cushion 12 supports the buttocks and thighs of a seated occupant. The seat back 14 is coupled to the rear end portion of the seat cushion 12, and supports the back of the seated occupant. The head rest 16 is coupled to the upper end portion of the seat back 14, and supports the head of the seated occupant. Note that the seat cushion 12 is coupled to the floor of a vehicle body (not shown). In addition, in the present embodiment, the front, rear, left, right, upper and lower sides of the vehicle seat 10 respectively coincide with the front, rear, left, right, upper and lower sides of the vehicle.

The seat back 14 includes a seat back frame 18 that serves as a frame member. A seat back pad (not shown) covered with a seat back skin 20 is supported by the seat back frame 18. The seat back frame 18 includes a pair of left and right side frames 22 and an upper frame 24. The side frames 22 extend in a seat back height direction. The upper frame 24 extends in a seat back width direction. Both longitudinal end portions of the upper frame 24 are respectively fixed to the upper end portions of the left and right side frames 22 by means, such as welding. Then, the upper end portions of the pair of side frames 22 are coupled by the upper frame 24 in the seat back width direction. In addition, the lower end portions of the pair of side frames 22 are coupled to the rear end portion of a seat cushion frame (not shown) provided in the seat cushion 12. Note that, in the present embodiment, the upper frame 24 is formed of a pipe material, and the pair of side frames 22 are formed of a sheet metal. However, not only to these members, for example, the upper frame 24 may be formed of a sheet metal or the upper frame 24 and the pair of side frames 22 may be integrally formed of a single pipe material bent in an inverted U shape.

Figure 2:
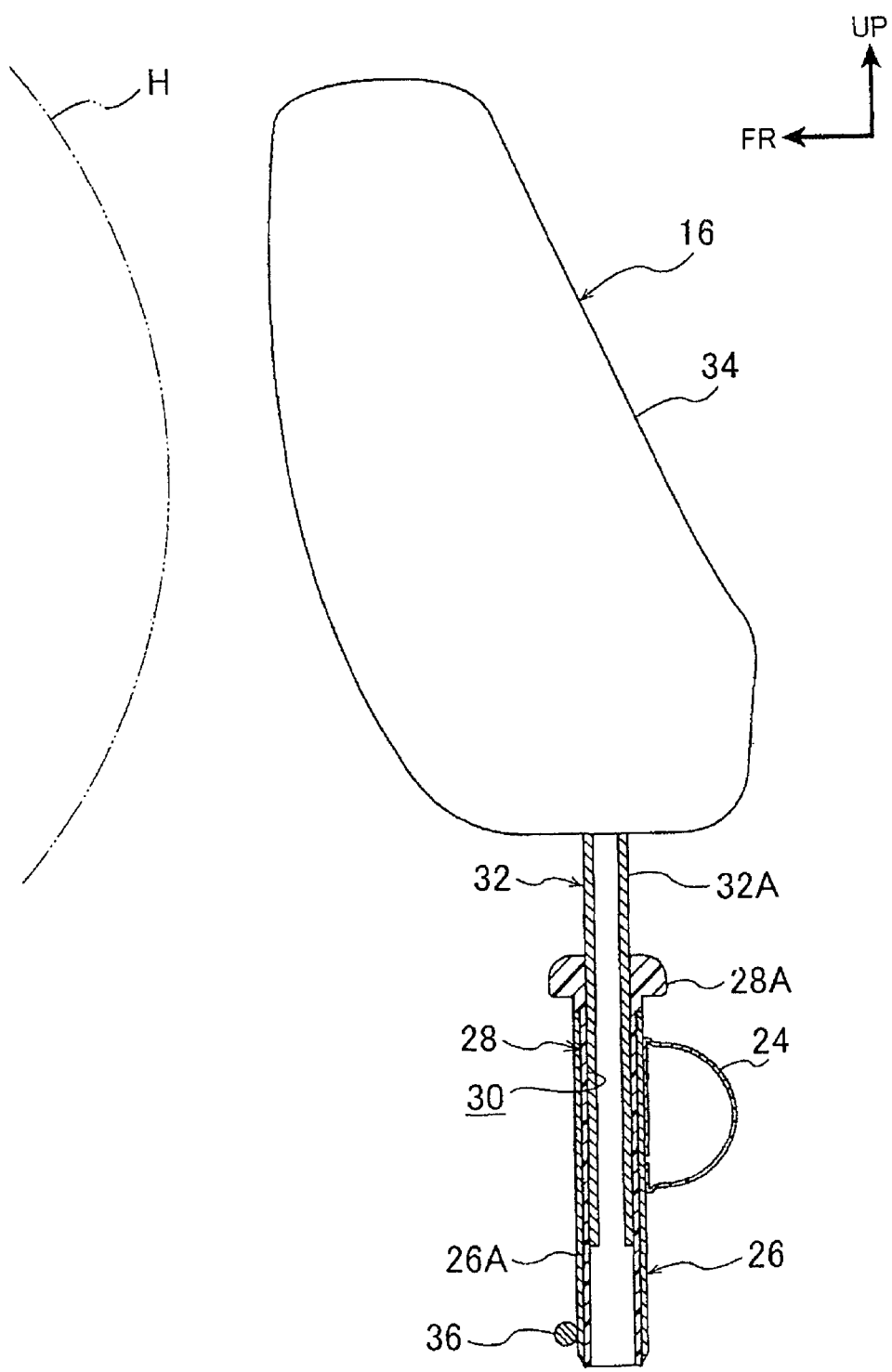
FIG. 2 is a longitudinal cross-sectional view taken along the line II-II in FIG. 1.
Figure 3:
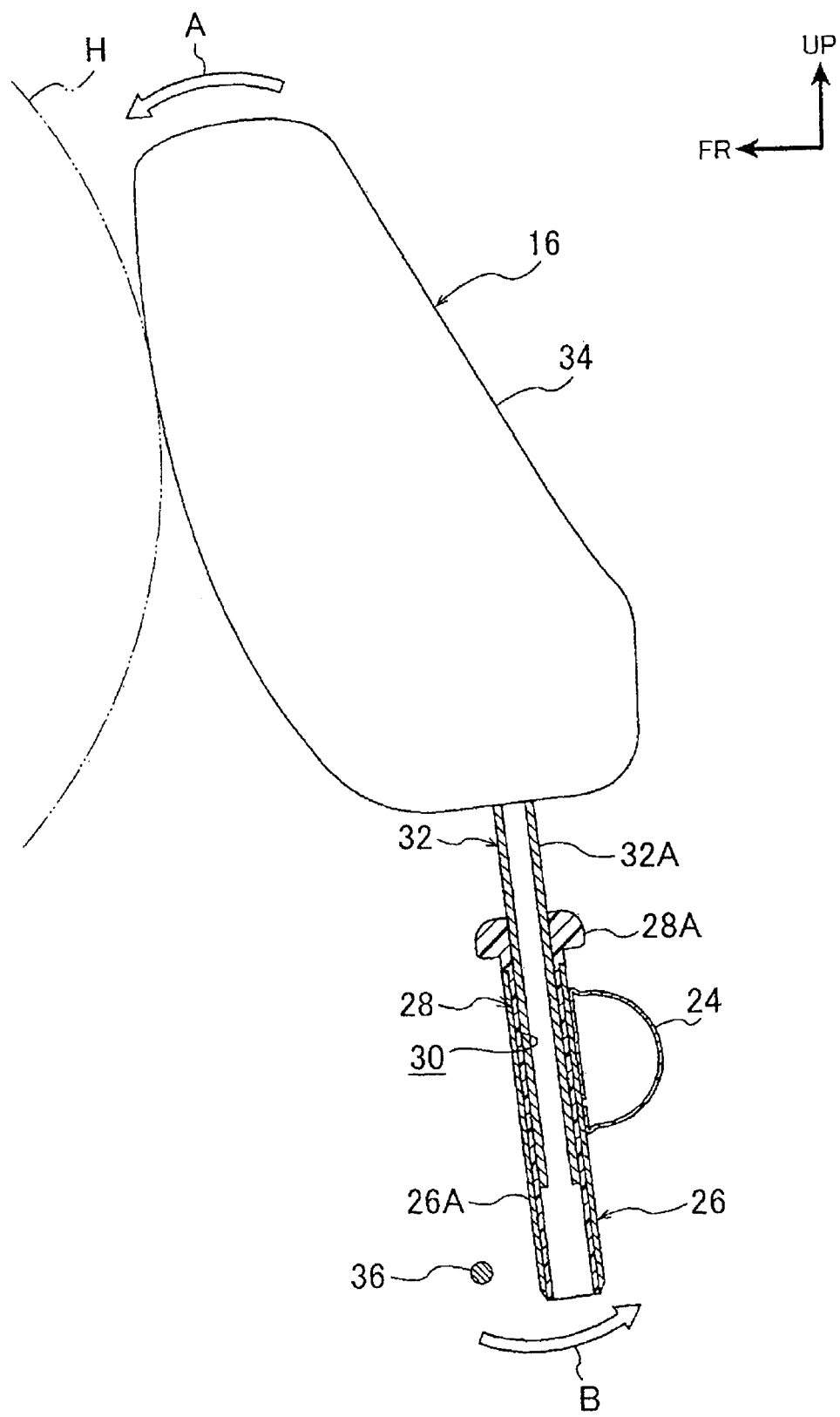
FIG. 3 is a longitudinal cross-sectional view that shows a state where a head rest is tilted forward with respect to a seat back frame and that corresponds to FIG. 2.

A pair of left and right support brackets 26 are fixed to the upper frame 24 at portions adjacent to the center in the longitudinal direction (at portions adjacent to the center in the seat back width direction). These support brackets 26 are formed of a sheet metal into a long square cylindrical shape. In addition, these support brackets 26 are arranged on both sides of the longitudinal center portion of the upper frame 24 in a state where the longitudinal direction is aligned along the seat back height direction. These support brackets 26 are arranged on the seat back front side of the upper frame 24. The vertical middle portions of the support brackets 26 are fixed to the front face of the upper frame 24 by welding, or the like. Note that, as shown in FIG. 2 and FIG. 3, the upper frame 24 is formed such that portions to which the left and right support brackets 26 are fixed are crushed into a semicircular shape in cross section. By so doing, the contact area between the upper frame 24 and each support bracket 26 is increased. The upper end of each of the left and right support brackets 26 slightly protrudes toward a seat back upper side from the upper frame 24, and the lower end thereof significantly protrudes toward a seat back lower side from the upper frame 24.

Head rest supports 28 are respectively fitted to the left and right support brackets 26. The head rest supports 28 each are formed of a resin material into a long substantially square cylindrical shape, and are respectively inserted (fitted) into the support brackets 26 via the upper opening portions of the support brackets 26. Flange portions 28A are respectively formed at the upper end portions of the head rest supports 28. Then, the flange portions 28A respectively contact the upper ends of the support brackets 26 to restrict displacements of the head rest supports 28 toward the seat back lower side with respect to the support brackets 26. In addition, each head rest support 28 has an insertion hole 30 that longitudinally extends through the head rest support 28. The size of each insertion hole 30 corresponds to the diameter of a head rest frame 32 that serves as the frame member of the head rest 16.

The head rest frame 32 is formed by bending a pipe material into an inverted U shape. The head rest frame 32 is formed of a pair of left and right leg portions 32A and an upper portion 32B. The upper portion 32B couples the upper end portions of these leg portions 32A in the seat back width direction. The upper portions of the pair of leg portions 32A and the upper portion 32B are embedded in a head rest pad (not shown) covered with a head rest skin 34. The lower portions of the pair of leg portions 32A protrude downward from the head rest pad. These leg portions 32A are inserted in the insertion holes 30 of the left and right head rest supports 28 fitted to the left and right support brackets 26. In addition, a restraining mechanism (not shown) provided for one of the left and right head rest supports 28 engages the leg portion 32A inserted in the one of the head rest supports 28. By so doing, up-and-down movements of the head rest 16 with respect to the seat back 14 are restricted, and the head rest 16 is supported by the seat back 14 via the head rest supports 28 and the support brackets 26.

In addition, a bracket contact member 36 is provided on the seat back front side of the left and right support brackets 26 below the upper frame 24. The bracket contact member 36 is formed of a solid rod material made of a metal material, and is arranged between the left and right side frames 22 in a state where the longitudinal direction is aligned along the seat back width direction. The longitudinal one end portion of the bracket contact member 36 is fixed to one of the side frames 22, and the longitudinal other end portion of the bracket contact member 36 is fixed to the other one of the side frames 22. Thus, the bracket contact member 36 is bridged between the left and right side frames 22. The longitudinal middle portion of the bracket contact member 36 contacts front faces 26A at the lower portions of the left and right support brackets 26, and is fixed to the left and right side frames 22 in a state where the bracket contact member 36 is slightly pressed against the front faces 26A. Note that various structures, such as welding, fitting and screwing, may be employed as a structure of fixing the bracket contact member 36 to the left and right side frames 22.

Here, in the present embodiment, when the head rest 16 tilts (oscillates) forward and rearward with respect to the seat back frame 18 due to impact force input to the vehicle seat 10 in the event of a rear-end collision of the vehicle (in the event of a rear-face collision of the vehicle), the upper frame 24 twists and deforms. Thus, the support brackets 26 rotate around the upper frame 24. Specifically, when the head rest 16 tilts forward with respect to the seat back frame 18 (see the arrow A in FIG. 3), the lower portions of the support brackets 26 are displaced toward the vehicle rear side (see the arrow B in FIG. 3). In this case, the front faces 26A at the lower portions of the support brackets 26 are spaced apart from the bracket contact member 36, and forward tilting of the head rest 16 is allowed. On the other hand, when the head rest 16 attempts to tilt rearward with respect to the seat back frame 18, the lower portions of the support brackets 26 attempt to be displaced toward the vehicle front side. However, as shown in FIG. 2, the bracket contact member 36 contacts the front faces 26A. Therefore, displacements of the lower portions of the support brackets 26 toward the vehicle front side, and, as a result, rearward tilting of the head rest 16 is suppressed. That is, in the vehicle seat 10 according to the present embodiment, the stiffness at the time when the head rest 16 tilts forward with respect to the seat back frame 18 is set so as to be lower than the stiffness at the time when the head rest 16 tilts rearward with respect to the seat back frame 18. The stiffness at the time when the head rest 16 tilts forward with respect to the seat back frame 18 or the stiffness at the time when the head rest 16 tilts rearward with respect to the seat back frame 18 depends on the configuration of the head rest 16, the seat back frame 18, and members (the head rest frame 32, the head rest supports 28 and the support brackets 26) between the head rest 16 and the seat back frame 18.

Next, the operation and advantageous effects of the present embodiment will be described.

In the vehicle seat 10 having the above-described configuration, the stiffness at the time when the head rest 16 tilts forward with respect to the seat back frame 18 is lower than the stiffness at the time when the head rest 16 tilts rearward with respect to the seat back frame 18. Therefore, when impact force in the event of a rear-end collision of the vehicle is input to the vehicle seat 10, the forward tilting angle of the head rest 16 is larger than the rearward tilting angle at the time when the head rest 16 tilts forward and rearward with respect to the seat back frame 18 by inertia force. By so doing, as shown in FIG. 3, it is possible to tilt the head rest 16 forward by a larger angle, so it is possible to bring the head rest 16 close to the head H of the seated occupant. As a result, it is possible to reduce a period of time (contact time) from occurrence of a rear-end collision of the vehicle to when the head H of the seated occupant contacts the head rest 16, so it is possible to improve the whiplash reducing effect of the head rest 16.

Figure 4:
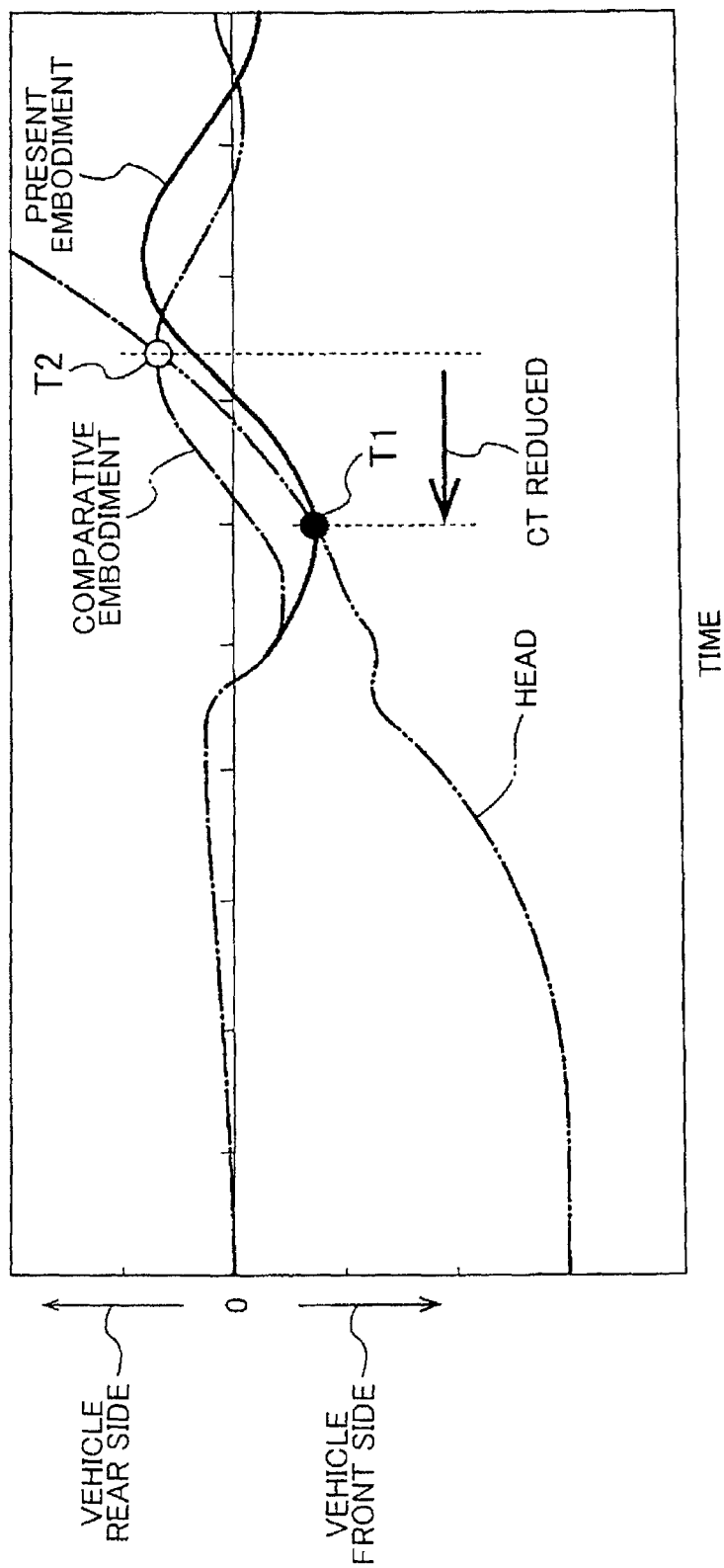
FIG. 4 is a diagram that shows the correlation between behaviors of the head rest and a seated occupant head with reference to a seat back and a period of time from occurrence of a rear-end collision in the event of a rear-end collision of a vehicle.

The above-described point will be described with reference to FIG. 4. FIG. 4 is a diagram that shows the correlation between behaviors (displacements) of the head rest and the seated occupant head with reference to the seat back and a period of time from occurrence of a rear-end collision in the event of a rear-end collision of the vehicle. In FIG. 4, the upper side of the ordinate axis above zero indicates a displacement toward the vehicle rear side with reference to the seat back 14, and the lower side of the ordinate axis below zero indicates a displacement toward the vehicle front side with reference to the seat back 14. In addition, in FIG. 4, the solid line indicates the behavior of the head rest 16 in the vehicle seat 10, the alternate long and short dash line indicates the behavior of a head rest in a general vehicle seat (hereinafter, referred to as comparative embodiment), and the alternate long and two short dashes line indicates the behavior of a seated occupant head. In addition, in FIG. 4, point T1 indicates a point in time at which the head rest 16 of the vehicle seat 10 contacts the seated occupant head, and point T2 indicates a point in time at which the head rest according to the comparative embodiment contacts the seated occupant head. As shown in FIG. 4, a displacement of the head rest 16 in the vehicle seat 10 toward the vehicle front side is larger than that of the head rest according to the comparative embodiment. In addition, in the vehicle seat 10, the head rest contacts the head of the seated occupant at the time when the displacement of the head rest 16 toward the vehicle front side is maximum (see T1 in FIG. 4), and the contact time CT is significantly reduced as compared with the comparative embodiment. Thus, with the vehicle seat 10, it is possible to improve the whiplash reducing effect of the head rest 16.

In addition, in the present embodiment, the bracket contact member 36 that contacts the support bracket 26 is just fixed to the seat back frame 18, so the configuration is simple, and it is possible to suppress an increase in the number of components, weight and manufacturing cost.

Furthermore, in the present embodiment, the bracket contact member 36 is arranged on a seat back lower side of the upper frame 24 (upper portion) of the seat back frame 18, and is in contact with the front faces 26A at the lower portions of the support brackets 26. Therefore, it is desirable because the space on a seat back upper side of the upper frame 24 is not unnecessarily occupied by the arrangement space of the bracket contact member 36.

In addition, in the present embodiment, the bracket contact member 36 is merely formed of a solid rod material, so it is possible to extremely simplify the configuration of the bracket contact member 36. Thus, with this as well, it is possible to reduce manufacturing cost.

Furthermore, in the present embodiment, the bracket contact member 36 is fixed to the left and right side frames 22 in a state where the bracket contact member 36 is slightly pressed against the front faces 26A at the lower portions of the support brackets 26. Therefore, even when the support brackets 26 oscillate as the head rest 16 slightly tilts forward and rearward due to vibrations, or the like, while the vehicle is travelling, it is possible to prevent or suppress a repetition of spacing and collision of the front faces 26A of the support brackets 26 with respect to the bracket contact member 36. By so doing, it is possible to prevent or suppress occurrence of noise.

Figure 5:
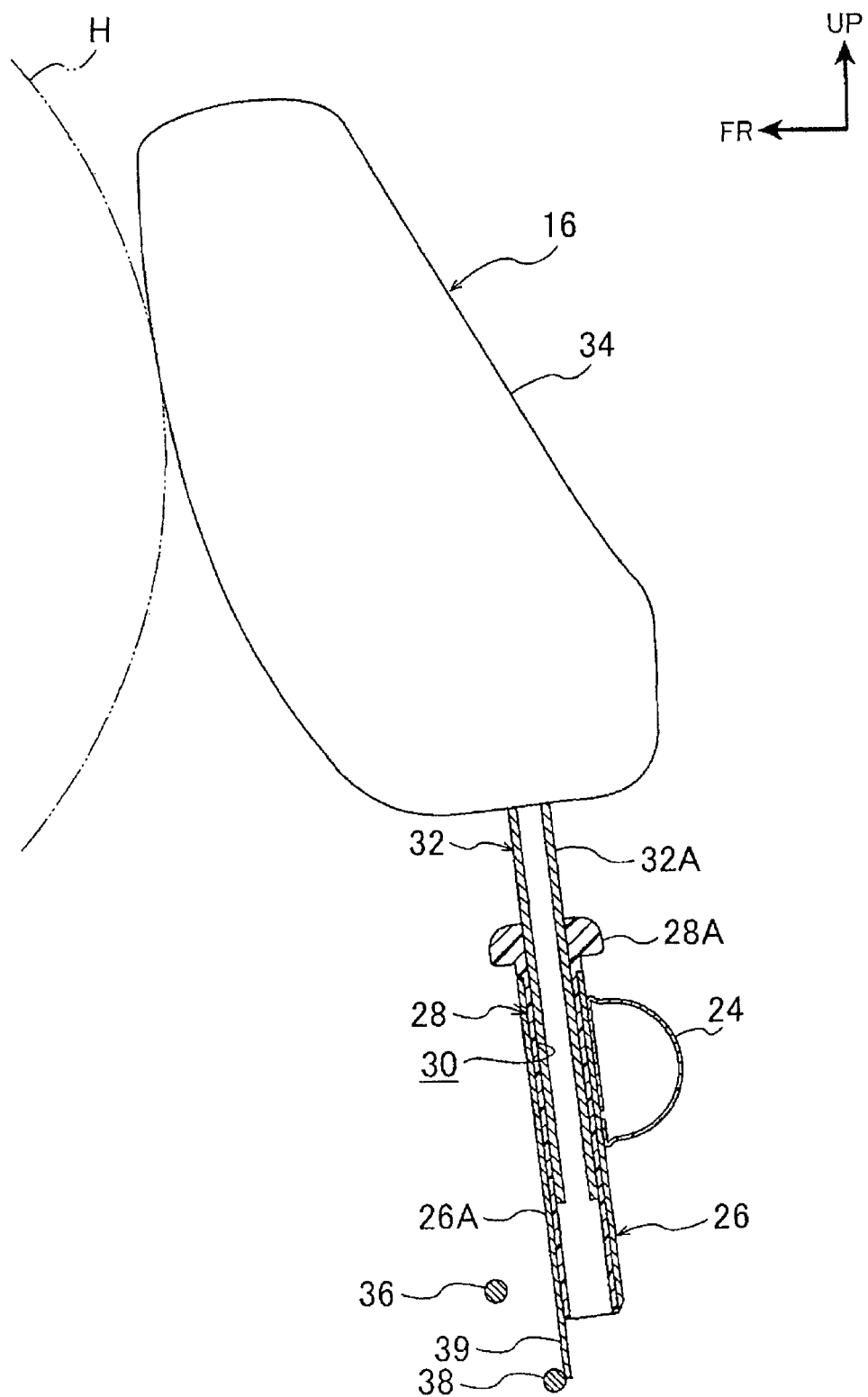
FIG. 5 is a longitudinal cross-sectional view that shows an alternative embodiment to the vehicle seat according to the embodiment of the invention and that corresponds to FIG. 3.

FIG. 5 is a longitudinal cross-sectional view that shows an alternative embodiment to the above-described embodiment and that corresponds to FIG. 3. In the alternative embodiment, a lock member 38 is arranged below the support brackets 26. The lock member 38, as well as the bracket contact member 36, is formed of a solid rod material made of a metal material, and is bridged between the left and right side frames 22. In addition, catch portions 39 extend from the lower ends of the support brackets. The catch portions 39 constitute a lock mechanism together with the lock member 38. The catch portions 39 is configured to catch on the lock member 38 when the lower ends of the support brackets 26 are displaced toward the vehicle rear side as the head rest 16 tilts forward with respect to the seat back frame 18 (state shown in FIG. 5). By so doing, the support brackets 26 are restrained at the displaced positions, it is possible to restrain the head rest 16 at the forward tilted position. As a result, it is possible to suppress rearward tilting of the head H of the seated occupant after the head H of the seated occupant is received by the head rest 16. Thus, it is possible to further improve the whiplash reducing effect of the head rest 16.

Note that the lock mechanism is not limited to the configuration according to the above-described alternative embodiment, but it may be implemented in various forms. For example, a lock member connected to the bracket contact member 36 may be configured to be held between the bracket contact member 36 and the support brackets 26 when the lower ends of the support brackets 26 are displaced toward the vehicle rear side. In addition, for example, resin catch portions extending from the lower ends of the head rest supports 28 may be configured to catch on the lock member 38 described in the above-described alternative embodiment.

The above embodiment is described on the case where the bracket contact member 36 is formed of a solid rod material; instead, the material of the bracket contact member may be changed as needed. For example, the bracket contact member may be formed of a pipe material or a sheet metal. In addition, in the above embodiment, the bracket contact member 36 is formed in a linear shape; instead, the bracket contact member may have a plurality of bent portions.

In addition, the above embodiment is described on the case where the cross-sectional shape of the bracket contact member 36 is circular; instead, the cross-sectional shape of the bracket contact member may be changed as needed. For example, the cross-sectional shape of the bracket contact member may be formed in a semicircular shape, and the planar portion may contact the front faces 26A of the support brackets 26.

In addition, in the above embodiment, both longitudinal end portions of the bracket contact member 36 are fixed to the left and right side frames 22; instead, both longitudinal end portions of the bracket contact member may be fixed to both longitudinal end portions of the upper frame.

In addition, in the above embodiment, the bracket contact member 36 is arranged on the seat back lower side of the upper frame 24 and contacts the front faces 26A at the lower portions of the support brackets 26; instead, the bracket contact member may be arranged on the seat back upper side of the upper frame and contact rear faces at the upper portions of the support brackets.

Next, a reference embodiment of the invention will be described. Note that like reference numerals denote basically similar components and operations to those of the above embodiment and the description thereof is omitted.

Figure 6:
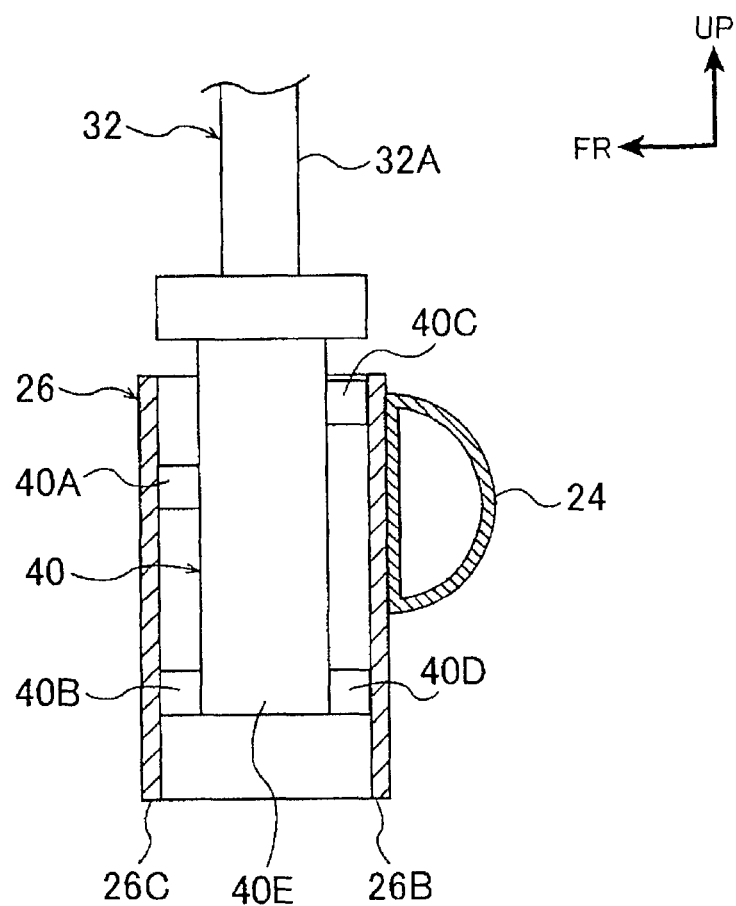
FIG. 6 is a schematic longitudinal cross-sectional view that shows the configuration of a portion around support brackets of a vehicle seat according to a reference embodiment of the invention.

FIG. 6 is a schematic longitudinal cross-sectional view that shows the configuration of a portion around support brackets 26 of a vehicle seat according to a reference embodiment of the invention. The reference embodiment has a basically similar configuration to that of the above embodiment; however, the bracket contact member 36 according to the above embodiment is omitted. In addition, in the reference embodiment, the configuration of each resin head rest support 40 differs from that of each head rest support 28 according to the above embodiment.

Each head rest support 40 has a front face upper protruding portion 40A, a front face lower protruding portion 40B, a rear face upper protruding portion 40C and a rear face lower protruding portion 40D, and each head rest support 40 is supported on a corresponding one of the support brackets 26 via these protruding portions. The front face lower protruding portion 40B and the rear face lower protruding portion 40D are arranged at the equivalent level; however, the front face upper protruding portion 40A is arranged below the rear face upper protruding portion 40C. Therefore, the stiffness at the time when the head rest supports 40 tilt forward with respect to the support brackets 26 is set so as to be lower than the stiffness at the time when the head rest supports 40 tilt rearward with respect to the support brackets 26. By so doing, the stiffness at the time when the head rest 16 tilts forward with respect to the seat back frame 18 is set so as to be lower than the stiffness at the time when the head rest 16 tilts rearward with respect to the seat back frame 18. Thus, in the reference embodiment as well, basically similar operation and advantageous effects to those of the above embodiment are obtained. In addition, because the bracket contact member 36 is omitted, it is possible to further reduce the number of components, weight and manufacturing cost.

In the above-described reference embodiment, the front face upper protruding portion 40A and the rear face upper protruding portion 40C may be arranged at the equivalent level, and the rear face lower protruding portion 40D may be arranged above the front face lower protruding portion 40B. In addition, in the above-described reference embodiment, the front face upper protruding portions 40A may be omitted. In any of these cases, basically similar operation and advantageous effects to those of the above-described reference embodiment are obtained.

In addition, in the above reference embodiment, even when the front face upper protruding portion 40A and the rear face upper protruding portion 40C are arranged at the equivalent level and the front face lower protruding portion 40B and the rear face lower protruding portion 40D are arranged at the equivalent level, but when the stiffness of the front face upper protruding portion 40A and rear face lower protruding portion 40D is set so as to be lower than the stiffness of the front face lower protruding portion 40B and rear face upper protruding portion 40C, basically similar operation and advantageous effects to those of the above reference embodiment are obtained. The above-described configuration is particularly effective in the case where the amplitude of tilting of the head rest 16 in the event of a rear-end collision of the vehicle is small, that is, in the case where the speed of a rear-end collision is low.

In addition, in the above reference embodiment, each support bracket 26 and a body portion 40E (see FIG. 6) of each head rest support 40 may be extended downward, and a cutout portion or a hole portion may be formed at the lower portion of a rear wall 26B of each support bracket 26. With such a configuration, the lower ends of the head rest supports 40 are configured to be inserted into the above cutout portions or hole portions when the head rest supports 40 tilt forward with respect to the support brackets 26. By so doing, it is possible to avoid interference between the head rest supports 40 and the rear walls 26B, so it is possible to increase the forward tilting angle of the head rest supports 40. The above configuration is particularly effective in the case where the amplitude of tilting of the head rest 16 in the event of a rear-end collision of the vehicle is large, that is, in the case where the speed of a rear-end collision is high. Note that, with the configuration that each support bracket 26 and the body portion 40E of each head rest support 40 are extended upward and a cutout portion is formed at an upper portion of a front wall 26C of each support bracket 26, similar operation and advantageous effects are obtained.

In addition, instead of the above cutout portions or hole portions, by changing the shape of each support bracket 26 as well, similar operation and advantageous effects are obtained. For example, an inclined portion or stepped portion may be formed at the lower portion of the rear wall 26B of each support bracket 26 and the upper portion of the front wall 26C of each support bracket 26, and a clearance between each support bracket 26 and the corresponding head rest support 40 may be increased at a portion at which the inclined portion or stepped portion is formed.

In addition, in the above reference embodiment, the protruding portions, such as the front face upper protruding portion 40A, are provided on each head rest support 40; instead, protruding portions may be provided on the inner periphery of each support bracket 26.

In addition, in the above reference embodiment as well, a lock mechanism may be added. For example, pawl portions provided at the upper end portions or lower end portions of the head rest supports 40 are configured to catch on the upper ends of the front walls 26C of the corresponding support brackets 26, the lower ends of the rear walls 26B of the corresponding support brackets 26 or edges of hole portions formed in one of the front walls 26C and the rear walls 26B when the head rest supports 40 tilt forward with respect to the support brackets 26. By so doing, it is possible to restrain the head rest supports 40 and the head rest 16 supported by the head rest supports 40 in a forward tilted state. In addition, for example, protruding portions formed on side faces (faces directed in the seat back width direction) of the head rest supports 40 may be configured to be fitted to hole portions formed in side walls (walls directed in the seal back width direction) of the support brackets 26 when the head rest supports 40 tilt forward with respect to the support brackets 26. In this case as well, similar operation and advantageous effects to those described above are obtained.

The invention claimed is:

1. A vehicle seat comprising:
   a seat back frame which has an upper frame extending in a seat back width direction at an upper portion of the seat back frame;
   a support bracket that is fixed to the upper frame of the seat back frame so that a lower portion of the support bracket protrudes toward a seat back lower side from the upper frame, wherein a head rest support is connected to the support bracket, and the support bracket supports a head rest via the head rest support; and
   a bracket contact member that is provided on a seat back lower side with resect to the upper frame and is connected to the seat back frame, and that contacts a front face at the lower portion of the support bracket to suppress rearward tilting of the head rest with respect to the seat back frame;
   wherein the seat back frame has a pair of left and right side frames that extend in a seat back height direction, upper portions of the pair of side frames being coupled by an upper frame, and
   the bracket contact member is bridged between the pair of side frames.

2. The vehicle seat according to claim 1, wherein
   the upper frame extends in a seat back width direction and is provided at the upper portion of the seat back frame,
   the support bracket is fixed to the upper frame in a state where a lower end of the support bracket protrudes toward a seat back lower side beyond the upper frame, and
   the bracket contact member is arranged below the upper frame, and is in contact with a front face at a lower portion of the support bracket.

3. The vehicle seat according to claim 1, wherein
   the support bracket is arranged forward of the upper frame, and a vertical middle portion of the support bracket is fixed to a front face of the upper frame.

4. The vehicle seat according to claim 3, wherein
   the support bracket has an opening portion at its upper end, and the head rest support is inserted in the support bracket via the opening portion.

5. The vehicle seat according to claim 1, wherein
   the bracket contact member is a solid rod material.

6. The vehicle seat according to claim 1, further comprising:
   a lock mechanism that, when the support bracket is displaced with respect to the seat back frame as the head rest tilts forward with respect to the seat back frame, restrains the head rest support at the displaced position.

7. The vehicle seat according to claim 6, wherein
   the lock mechanism includes a lock member that is arranged below the support bracket and a catch portion that extends from a tower end of the support bracket, and, when the support bracket is displaced with respect to the seat back frame as the head rest tilts forward with respect to the seat back frame, the catch portion catches on the lock member.

* * * * *